United States Patent
Furukawa et al.

(10) Patent No.: US 8,964,843 B2
(45) Date of Patent: Feb. 24, 2015

(54) IMAGE PROCESSING METHOD, IMAGE PROCESSING APPARATUS AND COMPUTER READABLE STORAGE MEDIUM

(75) Inventors: Eiji Furukawa, Saitama (JP); Masatoshi Okutomi, Tokyo (JP); Masayuki Tanaka, Tokyo (JP)

(73) Assignees: Olympus Corporation, Tokyo (JP); Tokyo Institute of Technology, Tokyo (JP)

( * ) Notice: Subject to any disclaimer, the term of this patent is extended or adjusted under 35 U.S.C. 154(b) by 272 days.

(21) Appl. No.: 12/689,395

(22) Filed: Jan. 19, 2010

(65) Prior Publication Data

US 2010/0183074 A1 Jul. 22, 2010

Related U.S. Application Data

(63) Continuation of application No. PCT/JP2008/063089, filed on Jul. 15, 2008.

(30) Foreign Application Priority Data

Jul. 19, 2007 (JP) ................................. 2007-188351

(51) Int. Cl.
| | | |
|---|---|---|
| H04N 11/04 | (2006.01) | |
| H04N 7/12 | (2006.01) | |
| G06K 9/36 | (2006.01) | |

(Continued)

(52) U.S. Cl.
CPC ........ *H04N 19/00218* (2013.01); *G06T 3/4007* (2013.01); *H04N 19/00703* (2013.01); *H04N 19/00715* (2013.01); *H04N 19/00151* (2013.01); *H04N 19/00757* (2013.01); *H04N 19/00024* (2013.01); *H04N 19/00278* (2013.01); *H04N 19/00781* (2013.01); *H04N 19/00387* (2013.01);

(Continued)

(58) Field of Classification Search
None
See application file for complete search history.

(56) References Cited

U.S. PATENT DOCUMENTS 5,436,665 A * 7/1995 Ueno et al. ................ 375/240.14
6,558,324 B1 * 5/2003 Von Behren et al. ......... 600/440

(Continued)

FOREIGN PATENT DOCUMENTS

| JP | 2006-033062 A | 2/2006 |
| JP | 2006-033141 A | 2/2006 |
| JP | 2006-140886 A | 6/2006 |

OTHER PUBLICATIONS

International Search Report dated Aug. 26, 2008 issued in International Appln. No. PCT/JP2008/063089.

*Primary Examiner* — Frederick Bailey
(74) *Attorney, Agent, or Firm* — Holtz, Holtz, Goodman & Chick PC

(57) ABSTRACT

An image processing method includes: a frame selection step for selecting a base frame and a reference frame; an image displacement amount calculation step for calculating an image displacement amount between the reference frame and the base frame; a weighting coefficient generation step for generating a weighting coefficient using at least one of an encoding type of the reference frame and the motion information of the encoded moving image data; and an image quality improvement step for improving an image quality of the base frame using the image displacement amount calculated in the image displacement amount calculation step and the weighting coefficient generated in the weighting coefficient generation step.

6 Claims, 16 Drawing Sheets

(51) Int. Cl.
    *G06K 9/40*     (2006.01)
    *H04N 5/14*     (2006.01)
    *H04N 7/01*     (2006.01)
    *H04N 19/159*   (2014.01)
    *G06T 3/40*     (2006.01)
    *H04N 19/51*    (2014.01)
    *H04N 19/139*   (2014.01)
    *H04N 19/59*    (2014.01)
    *H04N 19/105*   (2014.01)
    *H04N 19/176*   (2014.01)
    *H04N 19/61*    (2014.01)
    *H04N 19/20*    (2014.01)
    *H04N 19/182*   (2014.01)

(52) U.S. Cl.
    CPC ... *H04N 19/00684* (2013.01); *H04N 19/00303* (2013.01)
    USPC ............. 375/240.16; 375/240.12; 382/236; 382/232; 382/254; 348/700; 348/459

(56) References Cited

U.S. PATENT DOCUMENTS

| | | | |
|---|---|---|---|
| 6,778,221 B1 * | 8/2004 | Nishioka et al. | 348/459 |
| 7,595,818 B2 * | 9/2009 | Shimizu | 348/208.99 |
| 2002/0036717 A1 * | 3/2002 | Abiko et al. | 348/700 |
| 2002/0044693 A1 * | 4/2002 | Ogawa | 382/236 |
| 2002/0075956 A1 * | 6/2002 | Haskell et al. | 375/240.12 |
| 2003/0112871 A1 * | 6/2003 | Demos | 375/240.15 |
| 2003/0185450 A1 * | 10/2003 | Garakani et al. | 382/232 |
| 2003/0198391 A1 * | 10/2003 | Fukuhara et al. | 382/232 |
| 2004/0022320 A1 * | 2/2004 | Kawada et al. | 375/240.16 |
| 2004/0086193 A1 * | 5/2004 | Kameyama et al. | 382/254 |
| 2005/0259736 A1 * | 11/2005 | Payson | 375/240.16 |
| 2006/0012830 A1 | 1/2006 | Aiso | |
| 2006/0088101 A1 * | 4/2006 | Han et al. | 375/240.16 |
| 2011/0158321 A1 * | 6/2011 | Kadono et al. | 375/240.16 |

* cited by examiner

| SUBJECT FRAME | SELECTED FRAME | SUBJECT FRAME BEFORE OR AFTER BASE FRAME? | |
|---|---|---|---|
| | | BEFORE | AFTER |
| | | IMAGE DISPLACEMENT AMOUNT UPDATING METHOD | |
| I | I | ✕ | ✕ |
| | P | METHOD A | ✕ |
| | B | METHOD A | METHOD A |
| P | I | ✕ | METHOD B |
| | P | METHOD A | METHOD B |
| | B | METHOD A | METHOD A |
| B | I | METHOD B | METHOD B |
| | P | METHOD B | METHOD B |
| | B | ✕ | ✕ |

| PROCESSING | PROCESSING CONTENT |
|---|---|
| (1) | ENCODING TYPE OF BASE FRAME I, P OR B? |
| (2) | ENCODING TYPE OF SUBJECT FRAME I, P OR B? |
| (3) | FRAMES (INCLUDING BASE FRAME) BETWEEN SUBJECT FRAME AND BASE FRAME INCLUDE FRAME IN WHICH PIXEL CORRESPONDING TO SUBJECT PIXEL OF SUBJECT FRAME EXISTS? IF SO, SELECT FRAME AND CORRESPONDING PIXEL. IF PLURALITY EXISTS, SELECT FRAME AND CORRESPONDING PIXEL CLOSEST TO BASE FRAME OR FRAME AND CORRESPONDING PIXEL WITH WHICH TRACKING CAN BE CONTINUED. |
| (4) | FRAMES (INCLUDING BASE FRAME) BETWEEN I OR P (WITHIN REFERENCE FRAME) CLOSE TO SUBJECT FRAME AND IN FRONT OF SUBJECT FRAME AND BASE FRAME INCLUDE FRAME IN WHICH PIXEL CORRESPONDING TO SUBJECT PIXEL OF SUBJECT FRAME EXISTS? IF SO, SELECT FRAME AND CORRESPONDING PIXEL. IF PLURALITY EXISTS, SELECT FRAME AND CORRESPONDING PIXEL CLOSEST TO BASE FRAME OR FRAME AND CORRESPONDING PIXEL WITH WHICH TRACKING CAN BE CONTINUED. |
| (5) | FRAMES (INCLUDING BASE FRAME) BETWEEN I OR P (WITHIN REFERENCE FRAME) CLOSE TO BASE FRAME AND TO REAR OF BASE FRAME AND SUBJECT FRAME INCLUDE FRAME IN WHICH PIXEL CORRESPONDING TO SUBJECT PIXEL OF SUBJECT FRAME EXISTS? IF SO, SELECT FRAME AND CORRESPONDING PIXEL. IF PLURALITY EXISTS, SELECT FRAME AND CORRESPONDING PIXEL CLOSEST TO BASE FRAME OR FRAME AND CORRESPONDING PIXEL WITH WHICH TRACKING CAN BE CONTINUED. |
| (6) | FRAMES BETWEEN I OR P (WITHIN REFERENCE FRAME) CLOSE TO SUBJECT FRAME AND IN FRONT OF SUBJECT FRAME AND I OR P (WITHIN REFERENCE FRAME) CLOSE TO BASE FRAME AND TO REAR OF BASE FRAME INCLUDE FRAME IN WHICH PIXEL CORRESPONDING TO SUBJECT PIXEL OF SUBJECT FRAME EXISTS? IF SO, SELECT FRAME AND CORRESPONDING PIXEL. IF PLURALITY EXISTS, SELECT FRAME AND CORRESPONDING PIXEL CLOSEST TO BASE FRAME OR FRAME AND CORRESPONDING PIXEL WITH WHICH TRACKING CAN BE CONTINUED. |
| (7) | FRAMES (INCLUDING BASE FRAME) BETWEEN I OR P (WITHIN REFERENCE FRAME) CLOSE TO SUBJECT FRAME AND TO REAR OF SUBJECT FRAME AND BASE FRAME INCLUDE FRAME IN WHICH PIXEL CORRESPONDING TO SUBJECT PIXEL OF SUBJECT FRAME EXISTS? IF SO, SELECT FRAME AND CORRESPONDING PIXEL. IF PLURALITY EXISTS, SELECT FRAME AND CORRESPONDING PIXEL CLOSEST TO BASE FRAME OR FRAME AND CORRESPONDING PIXEL WITH WHICH TRACKING CAN BE CONTINUED. |
| (8) | FRAMES (INCLUDING BASE FRAME) BETWEEN I OR P (WITHIN REFERENCE FRAME) CLOSE TO BASE FRAME AND IN FRONT OF BASE FRAME AND SUBJECT FRAME INCLUDE FRAME IN WHICH PIXEL CORRESPONDING TO SUBJECT PIXEL OF SUBJECT FRAME EXISTS? IF SO, SELECT FRAME AND CORRESPONDING PIXEL. IF PLURALITY EXISTS, SELECT FRAME AND CORRESPONDING PIXEL CLOSEST TO BASE FRAME OR FRAME AND CORRESPONDING PIXEL WITH WHICH TRACKING CAN BE CONTINUED. |
| (9) | FRAMES BETWEEN I OR P (WITHIN REFERENCE FRAME) CLOSE TO SUBJECT FRAME AND TO REAR OF SUBJECT FRAME AND I OR P (WITHIN REFERENCE FRAME) CLOSE TO BASE FRAME AND IN FRONT OF BASE FRAME INCLUDE FRAME IN WHICH PIXEL CORRESPONDING TO SUBJECT PIXEL OF SUBJECT FRAME EXISTS? IF SO, SELECT FRAME AND CORRESPONDING PIXEL. IF PLURALITY EXISTS, SELECT FRAME AND CORRESPONDING PIXEL CLOSEST TO BASE FRAME OR FRAME AND CORRESPONDING PIXEL WITH WHICH TRACKING CAN BE CONTINUED. |

I: I FRAME(Intra-coded Frame) / I-Picture / I-VOP (Intra-coded Video Object Plane)
P: P FRAME(Predicted Frame) / P-Picture / P-VOP (Predicted Video Object Plane)
B: B FRAME(Bidirectional predicted Frame) / B-Picture / B-VOP (Bidirectional predicted Video Object Plane)

FIG. 9

| MACROBLOCK ENCODING TYPE OF I-VOP ||||
|---|---|---|---|
| INTRA(+Q) | INTRA-FRAME ENCODING (16×16pix) | 16pix × 16pix (empty) | NO MOTION VECTOR |

| MACROBLOCK ENCODING TYPES OF P-VOP ||||
|---|---|---|---|
| INTRA(+Q) | INTRA-FRAME ENCODING (16×16pix) | 16pix × 16pix (empty) | NO MOTION VECTOR |
| INTER(+Q) | FORWARD PREDICTIVE ENCODING (16×16pix) | 16pix × 16pix, single arrow | MOTION VECTOR TO FORWARD PREDICTED FRAME |
| INTER4V | FORWARD PREDICTIVE ENCODING (8×8pix = 4) | 8pix × 8pix, four arrows | MOTION VECTOR TO FORWARD PREDICTED FRAME |
| NOT CODED | NOT CODED | 16pix × 16pix, triangle | NO DIFFERENCE WITH FORWARD PREDICTED FRAME, BLOCK OF FORWARD PREDICTED FRAME USED AS IS, THEREFORE MOTION VECTOR ASSUMED TO BE 0 |

| MACROBLOCK ENCODING TYPES OF B-VOP ||||
|---|---|---|---|
| INTERPOLATE | BIDIRECTIONAL PREDICTIVE ENCODING (16×16pix) | 16pix × 16pix, bidirectional arrows | MOTION VECTORS TO FORWARD/BACKWARD PREDICTED FRAMES |
| FORWARD | FORWARD PREDICTIVE ENCODING (16×16pix) | 16pix × 16pix, solid arrow | MOTION VECTOR TO FORWARD PREDICTED FRAME |
| BACKWARD | BACKWARD PREDICTIVE ENCODING (16×16pix) | 16pix × 16pix, dashed arrow | MOTION VECTOR TO BACKWARD PREDICTED FRAME |
| DIRECT | BIDIRECTIONAL PREDICTIVE ENCODING (8×8pix = 4) | 16pix × 16pix, four bidirectional arrows | MOTION VECTORS TO FORWARD/BACKWARD PREDICTED FRAMES |

←———— : MOTION VECTOR TO FORWARD PREDICTED FRAME
←------- : MOTION VECTOR TO BACKWARD PREDICTED FRAME

FIG. 11

IMAGE PROCESSING METHOD, IMAGE PROCESSING APPARATUS AND COMPUTER READABLE STORAGE MEDIUM

CROSS-REFERENCE TO RELATED APPLICATIONS

This application is a continuation of International Patent Application No. PCT/JP2008/063089, filed on Jul. 15, 2008, which claims the benefit of Japanese Patent Application No. JP2007-188351, filed on Jul. 19, 2007, which is incorporated by reference as if fully set forth.

FIELD OF THE INVENTION

This invention relates to image processing, and more particularly to image processing with which the image quality of a frame image obtained from encoded moving image data including motion information can be improved.

BACKGROUND OF THE INVENTION

A conventional image pickup device, which increases the resolution of a base image by weighting a plurality of reference images when the resolution of a photographed image is enhanced, is known (JP2006-140886A, page 1, FIGS. 1 and 2). In this image pickup device, a larger weighting coefficient is applied to a reference image that is temporally closer to the base image, and a smaller weighting coefficient is applied to a reference image that is temporally farther from the base image.

DISCLOSURE OF THE INVENTION

According to an aspect of this invention, an image processing method for processing encoded moving image data including motion info information includes: a frame selection step for selecting a base frame and a reference frame from frame images obtained by decoding the encoded moving image data; an image displacement amount calculation step for calculating an image displacement amount between the reference frame and the base frame; a weighting coefficient generation step for generating a weighting coefficient using at least one of an encoding type of the reference frame and the motion information of the encoded moving image data; and an image quality improvement step for improving an image quality of the base frame using the image displacement amount calculated in the image displacement amount calculation step and the weighting coefficient generated in the weighting coefficient generation step.

According to another aspect of this invention, an image processing apparatus that uses encoded moving image data including motion information includes: a frame selection unit which selects a base frame and a reference frame from frame images obtained by decoding the encoded moving image data; an image displacement amount calculation unit which calculates an image displacement amount between the reference frame and the base frame; a weighting coefficient generation unit which generates a weighting coefficient in relation to each pixel of the reference frame using at least one of an encoding type of the reference frame and the motion information of the encoded moving image data; and an image quality improvement unit which improves an image quality of the base frame using the image displacement amount calculated by the image displacement amount calculation unit and the weighting coefficient generated by the weighting coefficient generation unit.

According to a further aspect of this invention, in a computer readable storage medium stored with a computer program that causes a computer to execute image processing using encoded moving image data including motion information, the computer program includes: a frame selection step for selecting a base frame and a reference frame from frame images obtained by decoding the encoded moving image data; an image displacement amount calculation step for calculating an image displacement amount between the reference frame and the base frame; a weighting coefficient generation step for generating a weighting coefficient using at least one of an encoding type of the reference frame and the motion information of the encoded moving image data; and an image quality improvement step for improving an image quality of the base frame using the image displacement amount calculated in the image displacement amount calculation step and the weighting coefficient generated in the weighting coefficient generation step.

Embodiments and advantages of this invention will be described in detail below with reference to the attached figures.

BRIEF DESCRIPTION OF THE DRAWINGS

FIG. 9 is a view showing the processing content of processing (1) to (9) in FIG. 6.

FIG. 11 is a view showing a macroblock encoding mode of each frame encoding type and a motion vector included in each macroblock in each mode.

DETAILED DESCRIPTION OF THE PREFERRED EMBODIMENTS

First Embodiment

An image processing method and an image processing apparatus according to a first embodiment of this invention will now be described.

Figure 1:
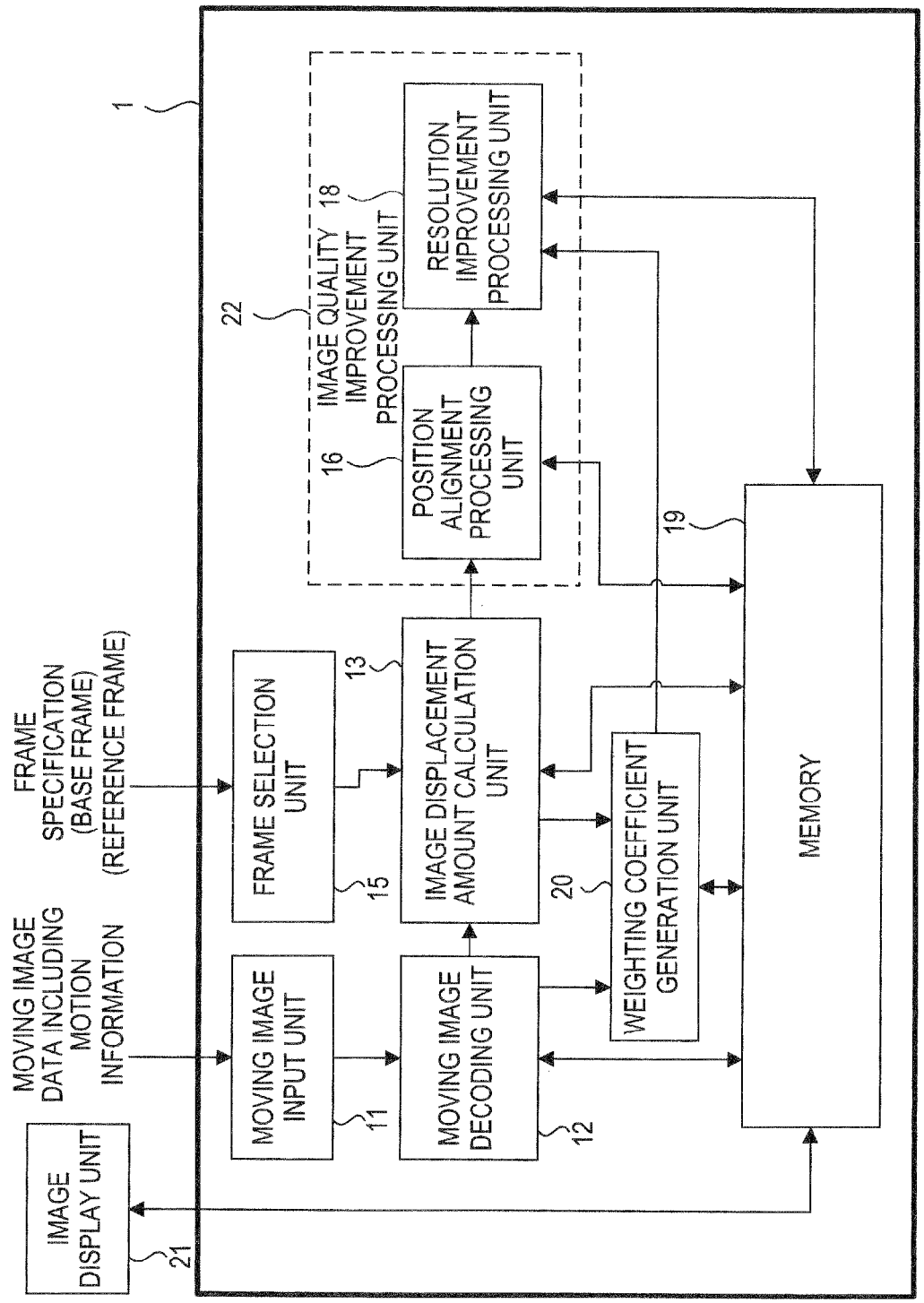
FIG. 1 is a block diagram showing the constitution of an image processing apparatus for implementing an image processing method according to a first embodiment of this invention.

FIG. 1 is a block diagram showing the constitution of an image processing apparatus for implementing an image processing method according to a first embodiment of this invention. An image processing apparatus 1 shown in FIG. 1 includes a moving image input unit 11 into which moving image data including motion information are input, a moving image decoding unit 12, an image displacement amount calculation unit 13, a frame selection unit 15 into which a frame specification is input from a user or the like, a position alignment processing unit 16, a resolution improvement processing unit 18, a memory 19, a weighting coefficient generation unit 20, and an image display unit 21, wherein the position alignment processing unit 16 and the resolution improvement processing unit 18 function as an image quality improvement processing unit 22. The image display unit 21 may be provided integrally with or separately to the image processing apparatus 1.

In this embodiment, it is assumed that the moving image data including motion information are pre-existing data including any type of moving image data that include inter-frame image motion information (motion vector information). Examples of typical current moving image data including motion information include moving image data encoded in accordance with MPEG (Moving Picture Expert Group) 1, MPEG2, MPEG4, H.261, H.263, H.264, and so on.

The moving image data including motion information are input into the moving image input unit 11, whereupon continuous frame images are decoded by the moving image decoding unit 12 and stored in the memory 19. In the case of MPEG, for example, the moving image decoding unit 12 decodes the frame images and extracts a motion vector by decoding and converting inter-frame image motion vector information. In motion vector information recorded in MPEG, a difference value between a motion vector of a subject block (to be described below) and a motion vector of an adjacent block is compressed and encoded, and therefore conversion is performed by adding the difference value to the motion vector of the adjacent block after the motion vector information is decoded, whereupon the motion vector of the subject block is extracted. Further, the moving image decoding unit 12 corresponds to an MPEG4 decoder shown in FIG. 3, to be described below.

The stored decoded data can be displayed on the image display unit 21 as a moving image, and the user can view the image displayed by the image display unit 21 and specify a base frame to be subjected to image quality improvement processing such as resolution improvement processing, for example, and a reference frame to be used in the image quality improvement processing. In accordance with the frame specification from the user, the frame selection unit 15 outputs specified frame information to the image displacement amount calculation unit 13. The image displacement amount calculation unit 13 obtains the motion vector extracted by the moving image decoding unit 12, for example, via the memory 19 or the moving image decoding unit 12, and calculates an image displacement amount from each of the specified reference frames to the base frame by accumulating the motion vector.

A type of encoding (to be described below) applied to each of the frame images decoded by the moving image decoding unit 12 and a number of accumulation of the motion vector in the image displacement amount calculation unit 13 are input into the weighting coefficient generation unit 20. The weighting coefficient generation unit 20 uses these data to generate a weighting coefficient which is output to the resolution improvement processing unit 18.

The image displacement amount calculated by the image displacement amount calculation unit 13 is input into the position alignment processing unit 16 and used to determine positional correspondence between the base frame and the respective reference frames in each pixel. The position alignment processing unit 16 is capable of accessing the decoded frame images stored in the memory 19 freely. Data relating to the base frame and reference frames for which positional correspondence has been determined are input into the resolution improvement processing unit 18. The resolution improvement processing unit 18 performs image quality improvement processing using the data relating to the base frame and reference frames for which positional correspondence has been determined and the weighting coefficient generated by the weighting coefficient generation unit 20. In this embodiment, resolution improvement processing is performed as the image quality improvement processing, and therefore a high-resolution image having a higher resolution than the frame image decoded by the moving image decoding unit 12 is generated and stored in the memory 19. The weighting coefficient data used by the resolution improvement processing unit 18 may be input into the resolution improvement processing unit 18 directly from the weighting coefficient generation unit 20 or input into the resolution improvement processing unit 18 via the memory 19. The high-resolution image stored in the memory 19 may be displayed on the image display unit 21 so that the user can check the high-resolution image on the image display unit 21.

Figure 2:
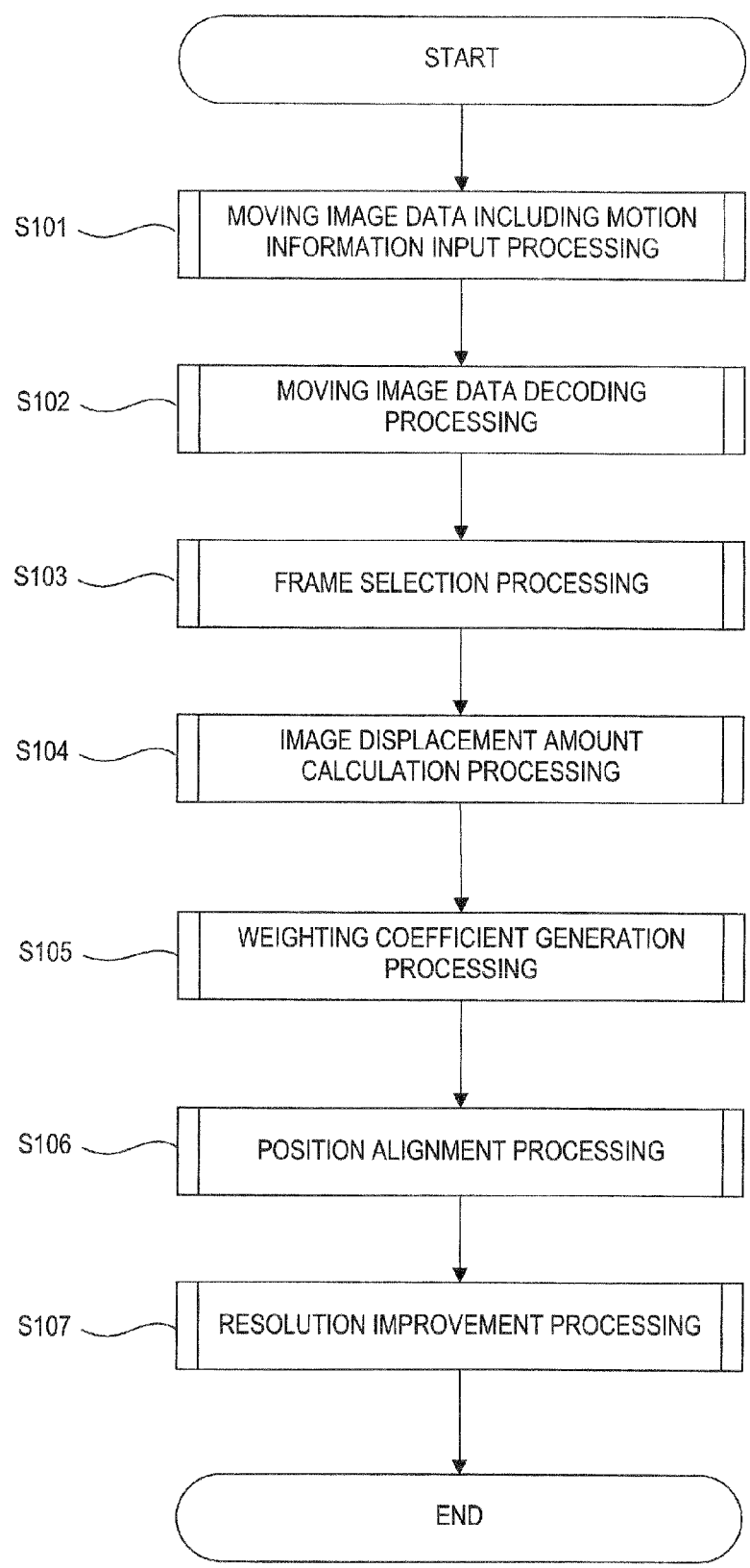
FIG. 2 is a flowchart showing processing performed in the image processing method according to the first embodiment.

FIG. 2 is a flowchart showing processing performed in the image processing method according to this embodiment. In an image processing method that uses motion information included in encoded moving image data according to this embodiment, first, moving image data are input through moving image data including motion information input processing (S101). Next, the input moving image data are decoded into motion vectors and continuous frame images through moving image data decoding processing (S102). Next, a base frame to be subjected to resolution improvement and a reference frame to be used in the resolution improvement are selected from the frame images on the basis of frame specification by the user through frame selection processing (S103).

In image displacement amount calculation processing (S104), an image displacement amount between the reference frame and the base frame is calculated by tracking each pixel of one or a plurality of frame images using the motion vector decoded in the moving image data decoding processing of S102. Next, in weighting coefficient generation processing (S105), a weighting coefficient is generated in relation to each pixel of the reference frame. In this case, the weighting coefficient is calculated using the type of encoding applied to the respective reference frames decoded in the moving image decoding processing (S102) and the number of accumulation of the motion vector in the image displacement amount calculation processing (S104). Positioning processing (S106) between the base frame and the reference frame is then performed using the image displacement amount calculated in the image displacement amount calculation processing (S104), whereupon a high-resolution image is generated by performing resolution improvement processing (S107) using the weighting coefficient generated in the weighting coefficient generation processing (S105).

Figure 3:
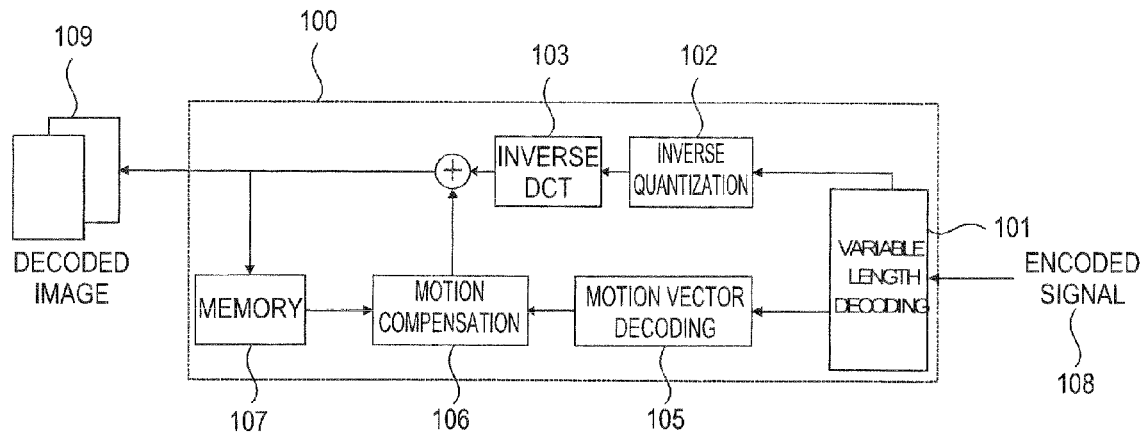
FIG. 3 is a block diagram showing the constitution of an MPEG4 decoding processing block.

FIG. 3 is a block diagram showing the constitution of an MPEG4 decoding processing block. In this embodiment, the moving image decoding unit 12 shown in FIG. 1 corresponds to a decoder 100 in the MPEG4 decoding processing block shown in FIG. 3. Further, the moving image data including motion information correspond to an encoded signal 108 shown in FIG. 3. The encoded signal 108 input into the decoder 100 is decoded by a variable length decoding block 101, whereupon image data are output to an inverse quantization block 102 and motion information data are output to a motion vector decoding block 105. The image data are then subjected to inverse DCT (Discrete Cosine Transform) by an inverse DCT block 103. A motion vector decoded by the motion vector decoding block 105 is motion-compensated by a motion compensation block 106 relative to a subject block of a previous frame image stored in a memory 107, whereupon a decoded image 109 is generated by adding the motion-compensated motion vector to the image data subjected to inverse DCT.

Figure 4:
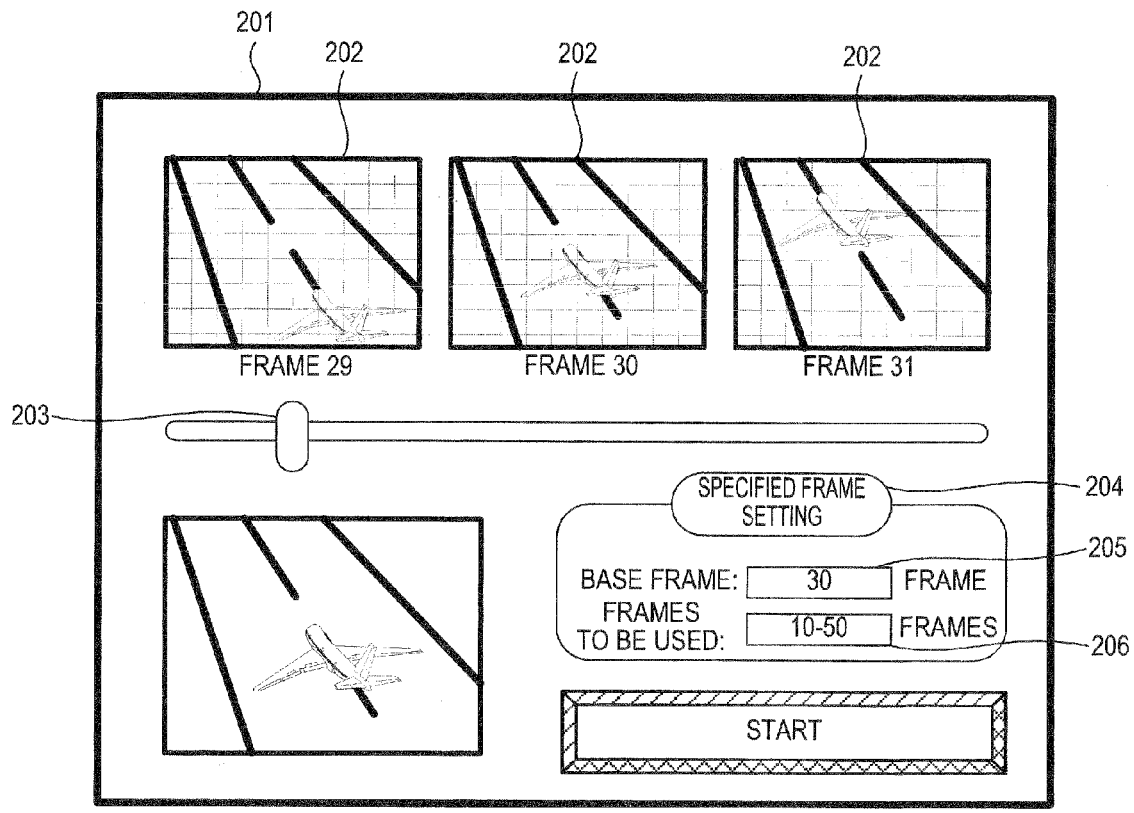
FIG. 4 is a view showing a specification method employed by a user to specify a base frame and a reference frame during frame specification according to this embodiment.

FIG. 4 is a view showing a specification method employed by the user to specify the base frame and the reference frame during the frame specification according to this embodiment. As shown in FIG. 4, the user can specify the base frame and the reference frame by checking a display of a decoded image 202 on a display screen 201 used to specify the base frame and reference frame while moving a decoded image display frame switching knob 203, and setting a frame number of the base frame to be subjected to resolution improvement and a frame number of the reference frame to be used in the resolution improvement in a base frame setting tab 205 and a frames to be used setting tab 206, respectively, of a specified frame setting tab 204.

Figure 5:
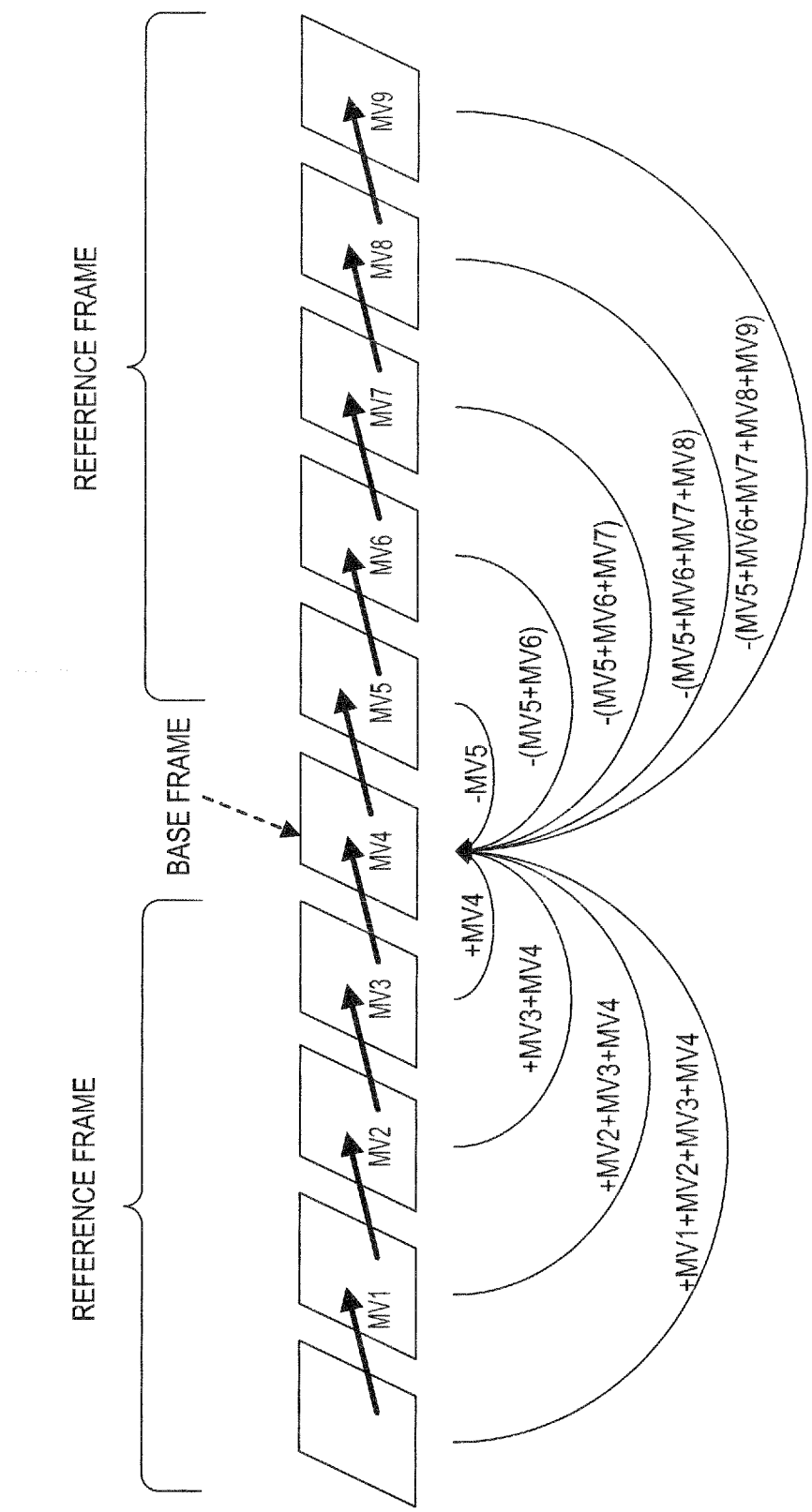
FIG. 5 is a view showing an outline of image displacement amount calculation processing employed during position alignment processing according to this embodiment.

FIG. 5 is a view showing an outline of the image displacement amount calculation processing (S104) for performing the position alignment processing (S106) according to this embodiment. As shown in FIG. 5, an image displacement amount (accumulated motion vector) between the base frame and each reference frame is determined on the basis of the frames specified by the user by accumulating motion vectors (MV1 to MV9 in FIG. 5) of the base frame and each employed reference frame selected in the frame selection processing (S103) while taking direction into account. By deforming the respective reference frames in accordance with the image displacement amounts, the base frame can be aligned relative to the respective reference frames. The image displacement amount calculation processing for determining the image displacement amounts is performed on each pixel of the frame image. The position alignment may be performed conversely in relation to the respective reference frames by deforming the base frame by a value obtained by inverting the directions of all of the image displacement amounts determined in the image displacement amount calculation processing. Hence, by tracking each pixel of one or a plurality of frame images using a motion vector included in each frame image, an image displacement amount from one frame image to another frame image can be determined, and as a result, a plurality of frame images can be aligned.

Figure 6:
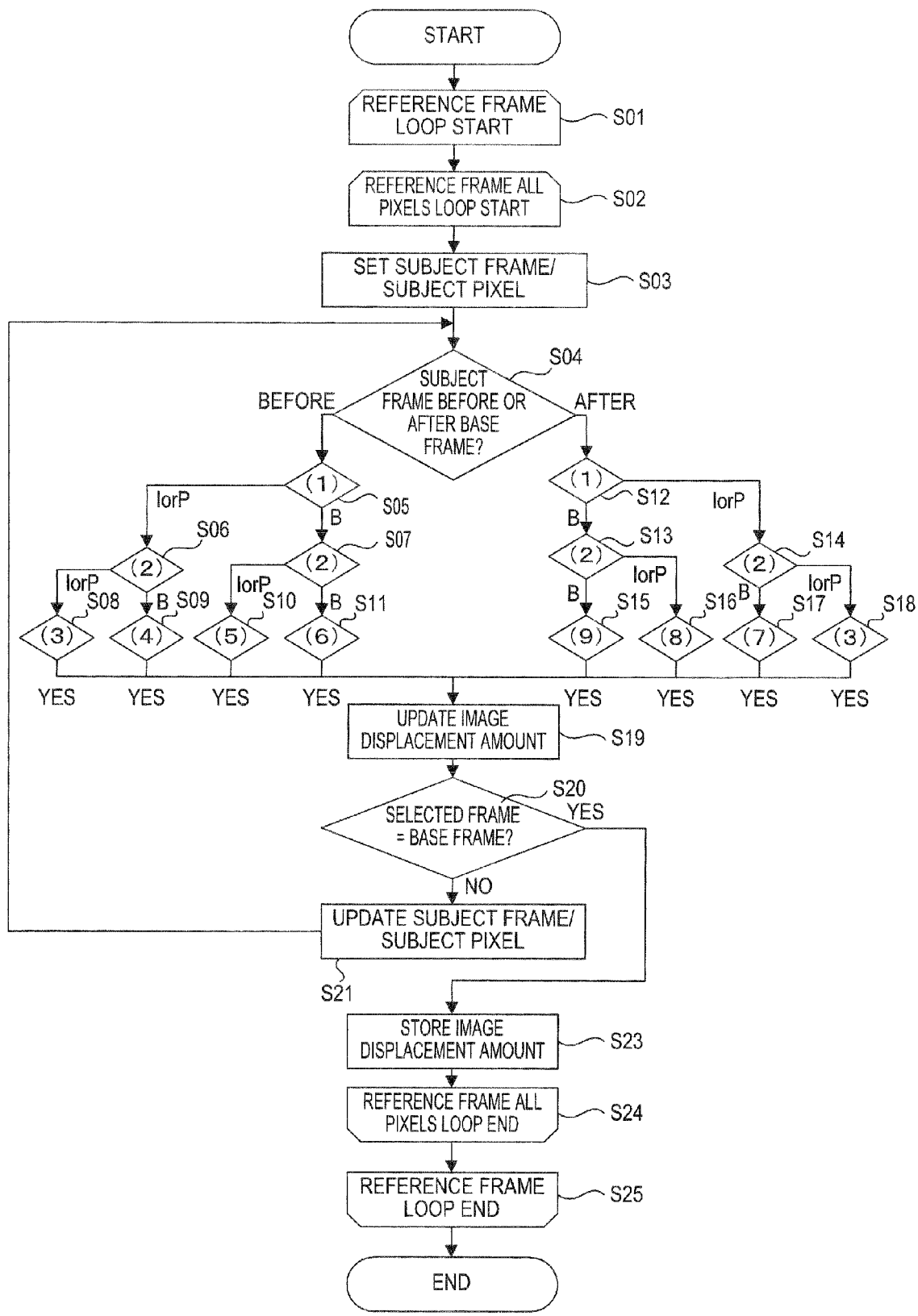
FIG. 6 is a flowchart showing the content of image displacement amount calculation processing shown in FIG. 2.
Figures 7, 8:
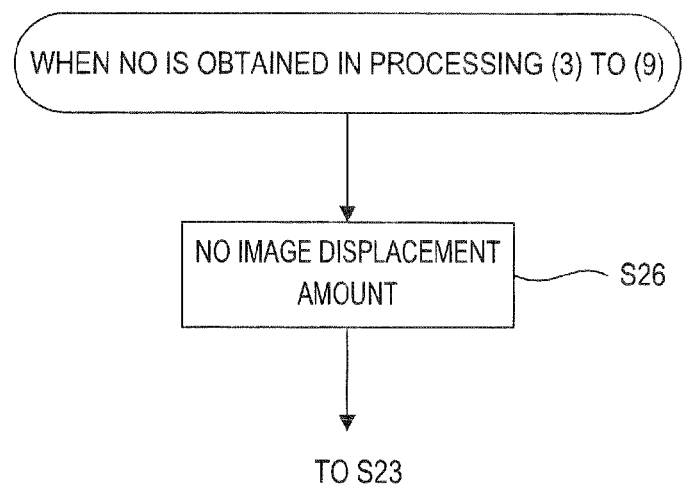
FIG. 7 is a flowchart showing the content of the image displacement amount calculation processing shown in FIG. 2.
FIG. 8 is a view showing a method of updating an image displacement amount during image displacement amount updating processing.

FIGS. 6 and 7 are flowcharts showing the content of the image displacement amount calculation processing (S104) of FIG. 2. The processing content of processing (1) to (9) in FIG. 6 is shown in FIG. 9. In the following description, I denotes "I frame (Intra-coded Frame)/I-Picture/I-VOP (Intra-coded Video Object Plane", P denotes "P frame (Predicted Frame)/P-Picture/P-VOP (Predicted Video Object Plane", and B denotes "B frame (Bidirectional predicted Frame)/B-Picture/B-VOP (Bidirectional predicted Video Object Plane", while a frame image is referred to simply as a frame. The I frame (I-VOP), P frame (P-VOP) and B frame (B-VOP) will be described later. First, the image displacement amount calculation processing (S104) will be described.

To calculate the image displacement amount in the image displacement amount calculation processing (S104), processing is performed using a loop (S01, S25) for the frames other than the base frame (i.e. the reference frames) and a loop (S02, S24) for all of the pixels in the respective reference frames, from among the base frame and reference frames selected in the frame selection processing (S103).

In the intra-loop processing, first, subject frame/subject pixel setting processing (S03) is performed to set a source subject frame and a subject frame as reference frames and to set a source subject pixel and a subject pixel as reference frame subject pixels. Here, the subject frame is a frame to which a pixel (including a pre-tracking initial pixel) tracked to a midway point using the motion vector, as described above, belongs at a set point in time, while the source subject frame is a frame to which the tracked pixel belonged previously. Further, the subject pixel is the pixel (including the pre-tracking initial pixel) tracked to a midway point at the set point in time, while the source subject pixel is a previously tracked pixel.

Following the subject frame/subject pixel setting processing (S03), a front/rear (before/after) relationship between the subject frame and the base frame is determined (S04), whereupon the encoding type of the base frame is determined in processing (1) (S05, S12) and the encoding type of the subject frame is determined in processing (2) (S06, S07, S13, S14).

Next, determination/selection processing is performed in processing (3) to (9) (S08, S09, S10, S11, S15, S16, S17, S18), taking into account combinations of encoding types. In the processing (3) to (9), as shown in FIG. 9, when a pixel corresponding to the subject pixel is searched for in order to track the subject frame to the base frame using the motion vector and a frame including a pixel that corresponds to the subject pixel is found within a predetermined range, the pixel is selected as a tracking destination pixel together with the frame including the pixel. When a pixel corresponding to the subject pixel is found in the processing (3) to (9) (YES), this means that a traceable motion vector exists.

When a pixel corresponding to the subject pixel and a corresponding frame are not selected in the processing (3) to (9) (S08, S09, S10, S11, S15, S16, S17, S18) (NO), "no image displacement amount" (S26 in FIG. 7) is stored (S23), and the routine advances to the end of the reference frame all pixel loop (S24).

When a pixel corresponding to the subject pixel and a corresponding frame are selected in the processing (3) to (9) (S08, SOY, S10, S11, S15, S16, S17, S18) (YES), the image displacement amount is updated by accumulating the motion vector, taking direction into account, in image displacement amount updating processing (S19).

FIG. 8 is a view showing a method of updating the image displacement amount during the image displacement amount updating processing (S19). There are two methods of updating the image displacement amount. In an updating method A shown in FIG. 8, a motion vector from the pixel of the selected frame corresponding to the subject pixel to the subject pixel of the subject frame is accumulated taking direction into account. In an updating method B shown in FIG. 8, a motion vector from the subject pixel of the subject frame to the pixel of the selected frame corresponding to the subject pixel is accumulated taking direction into account. As shown in FIG. 8, the updating method is selected in accordance with the subject frame, the encoding type of the selected frame, and the front/rear (before/after) relationship between the subject frame and the base frame.

Next, comparison processing (S20) is performed on the selected frame and the base frame. When a match is found, this means that the image displacement amount from the subject pixel of the reference frame to the pixel of the base frame corresponding to the subject pixel has been determined, and therefore the image displacement amount is stored (S23), whereupon the routine advances to the end of the reference frame all pixel loop (S24). When a match is not found, subject frame/subject pixel updating processing (S21) is performed to update the subject frame to the frame selected in the processing (3) to (9). As a result, the subject pixel is updated to the pixel selected in the processing (3) to (9), whereupon the routine returns to the processing (S04) for determining the front/rear relationship between the subject frame and the base frame. When the intra-loop processing has been performed for the reference frame all pixel loop (S02, S24) and the reference frame loop (S01, S25) of each reference frame, the image displacement amount calculation processing (S104) is terminated.

The image displacement amount calculation processing (S104) will now be described in detail using several patterns as examples. First, MPEG4 frame encoding types and macroblock encoding types within the respective encoding types will be described as a prerequisite to the description.

As noted above, three types of MPEG4 frames exist, namely I-VOP, P-VOP, and B-VOP. I-VOP is known as intra encoding, and during I-VOP itself encoding, prediction from another frame is not required as encoding is concluded within the frame. P-VOP and B-VOP are known as inter encoding, and during P-VOP itself encoding, predictive encoding is performed from a preceding I-VOP or P-VOP. During B-VOP itself encoding, predictive encoding is performed from a bidirectional (front-rear direction) I-VOP or P-VOP.

Figure 10A:
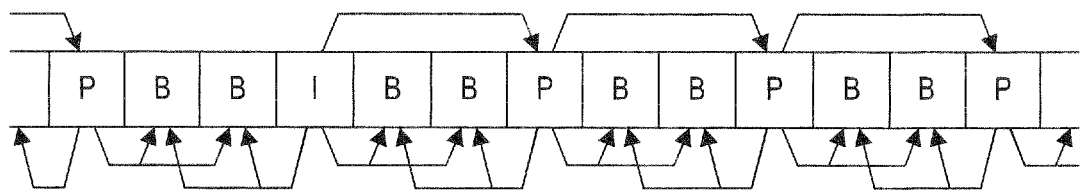
FIGS. 10A and 10B are views showing examples of a predicted direction during motion compensation and a direction of a motion vector included in each frame as a result of the motion compensation.
Figure 10B:
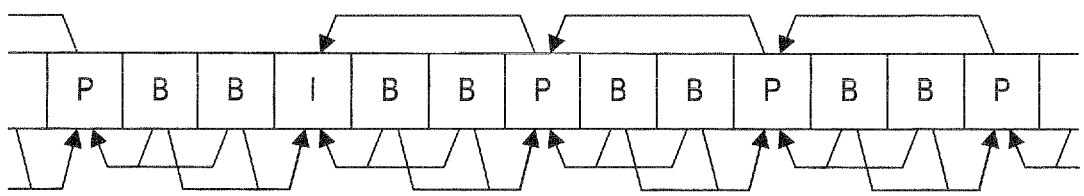

FIGS. 10A and 10B are views showing examples of a predicted direction during motion compensation and a direction of a motion vector (a frame toward which the motion vector is oriented) included in each frame (encoded and recorded in each frame) as a result of the motion compensation. FIG. 10A shows the predicted direction during motion compensation, while FIG. 10B shows the direction of the motion vector included in each frame in the example shown in FIG. 10A. Arrows in FIG. 10B are basically oriented oppositely to arrows in FIG. 10A.

For example, an I-VOP located fourth from the left in FIG. 10A is used to predict another frame but encoding of the I-VOP itself does not require prediction from another frame. In other words, as shown in FIG. 10B, a motion vector from the I-VOP located fourth from the left does not exist, and therefore the I-VOP itself does not possess a motion vector.

Further, a P-VOP located seventh from the left in FIG. 10A is predicted from the 1-VOP located fourth from the left. In other words, as shown in FIG. 10B, a motion vector from the P-VOP located seventh from the left is oriented toward the I-VOP located fourth from the left, and therefore the P-VOP itself possesses a motion vector.

Further, a B-VOP located fifth from the left in FIG. 10A is predicted from the I-VOP located fourth from the left and the P-VOP located seventh from the left. In other words, as shown in FIG. 10B, motion vectors from the B-VOP located fifth from the left are oriented toward the I-VOP located fourth from the left and the P-VOP located seventh from the left, and therefore the B-VOP itself possesses motion vectors.

However, in encoding such as MPEG4, an entire frame is not encoded at once, and instead, encoding is performed by dividing the frame into a plurality of macroblocks. In this case, several modes are provided for encoding each macroblock, and therefore motion vectors oriented in the directions described above do not always exist.

FIG. 11 is a view showing a macroblock encoding mode of each frame encoding type and a motion vector included in each macroblock in each mode. As shown in FIG. 11, an INTRA (+Q) mode is the only I-VOP macroblock encoding type. In this encoding type, 16×16 pixel intra-frame encoding is performed, and therefore no motion vectors exist.

The P-VOP macroblock encoding type includes four modes, namely INTRA (+Q), INTER (+Q), INTER4V, and NOT CODED. In INTER (+Q), 16×16 pixel intra-frame encoding is performed, and therefore no motion vectors exist. In INTER (+Q), 16×16 pixel forward predictive encoding is performed, and therefore a single motion vector oriented toward a forward predicted frame exists. In INTER4V, the 16×16 pixels are divided by four such that forward predictive encoding is performed in 8×8 pixel units, and therefore four motion vectors oriented toward the forward predicted frame exist. In NOT CODED, a difference with the forward predicted frame is small, and therefore the image data of a macroblock located in the same position as the forward predicted frame is used as is, without performing encoding. Hence, in actuality, no motion vectors exist. However, in this embodiment, it is assumed that a single motion vector oriented toward the forward predicted frame and having a value of "0" exists.

The B-VOP macroblock encoding type includes four modes, namely INTERPOLATE, FORWARD, BACKWARD, and DIRECT. In INTERPOLATE, 16×16 pixel bidirectional predictive encoding is performed, and therefore two motion vectors oriented respectively toward the forward predicted frame and a backward predicted frame exist. In FORWARD, 16×16 pixel forward predictive encoding is performed, and therefore a single motion vector oriented toward the forward predicted frame exists. In BACKWARD, 16×16 pixel backward predictive encoding is performed, and therefore a single motion vector oriented toward the backward predicted frame exists. In DIRECT, the 16×16 pixels are divided by four such that forward/backward predictive encoding is performed in 8×8 pixel units, and therefore four motion vectors oriented respectively toward the forward and backward predicted frames exist.

On the basis of this prerequisite, the image displacement amount calculation processing (S104) will now be described in detail using several patterns as examples, with reference to FIGS. 12 to 14C.

Figure 12:
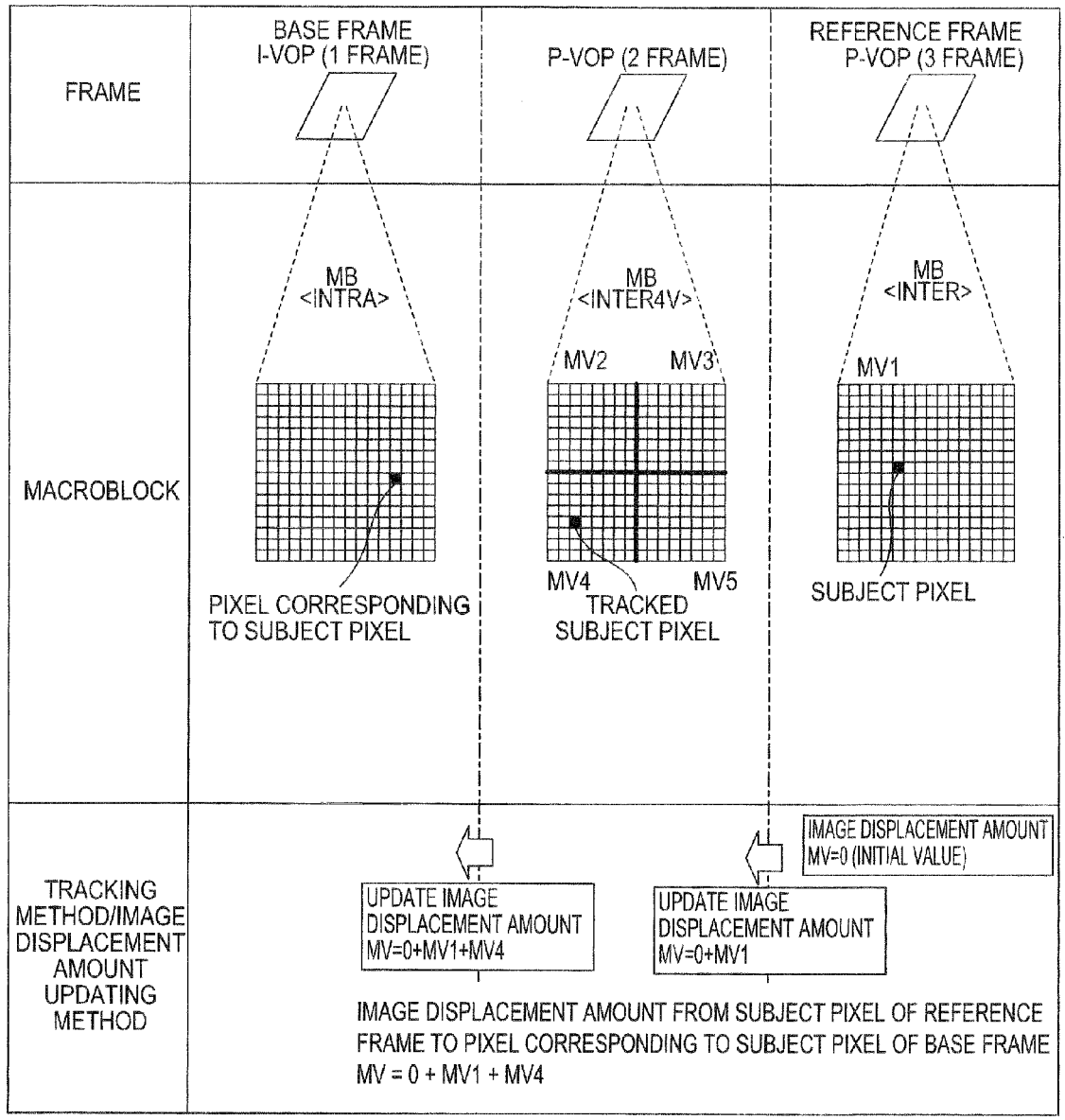
FIG. 12 is a view showing an example of tracking in the image displacement amount calculation processing.

FIG. 12 is a view showing an example of tracking in the image displacement amount calculation processing (S104). In the example shown in FIG. 12, a first frame is an I-VOP, a second frame and a third frame are P-VOPs, the first frame serves as the base frame, and the third frame serves as the reference frame. A subject pixel in the third frame serving as the reference frame is a pixel indicated by diagonal lines, and first, the motion vector of the macroblock including the subject pixel is searched for. In this example, the macroblock encoding type is INTER and the motion vector of the macroblock is MV1, and therefore the position of the subject pixel is moved using MV1. The moved pixel position is thus aligned with a position within the second frame P-VOP, whereupon the motion vector of the macroblock including the subject pixel is searched for similarly in relation to the corresponding subject pixel position of the second frame. In this example, the macroblock encoding type is INTER4V and the macroblock possesses four motion vectors. However, the motion vector of the 8×8 pixel block including the subject pixel is MV4, and therefore the position of the tracked subject pixel is moved further using MV4. The moved pixel position is then aligned with a position within the first frame I-VOP. In this example, the first frame is the base frame, and therefore the pixel position of the reference frame can be tracked to the base frame. Hence, by accumulating an initial value 0, MV1, and MV4, which are used during the tracking, the image displacement amount from the subject pixel of the reference frame to the pixel of the base frame corresponding to the subject pixel can be determined.

Figure 13:
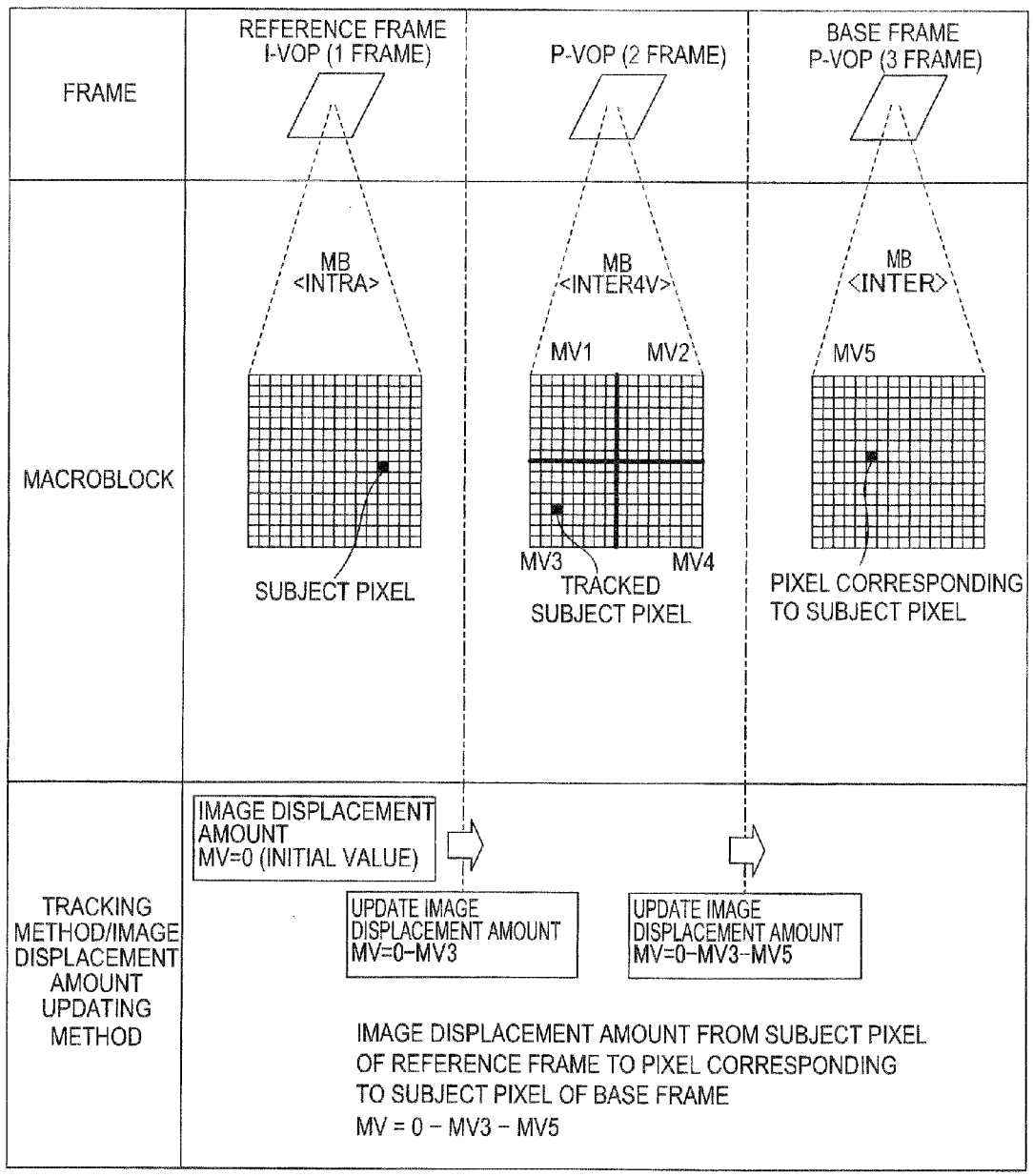
FIG. 13 is a view showing another example of tracking in the image displacement amount calculation processing.

FIG. 13 is a view showing another example of tracking in the image displacement amount calculation processing (S104). In the example shown in FIG. 13, the first frame is an I-VOP, the second frame and third frame are P-VOPs, the third frame serves as the base frame, and the first frame serves as the reference frame. The subject pixel in the first frame serving as the reference frame is a pixel indicated by diagonal lines, and first, a pixel corresponding to the subject pixel of the first frame is searched for from all of the pixels of the second frame P-VOP, which has a motion vector oriented toward the first frame. When a corresponding pixel is found, the position of the subject pixel is moved using −MV3, which is obtained by inverting the direction of the motion vector (in this example, INTER4V, MV3) of the macroblock of the second frame including the pixel, such that the moved pixel position is aligned with a position within the second frame P-VOP, whereupon a pixel corresponding to the subject pixel of the second frame is searched for similarly from all of the pixels of the third frame P-VOP in relation to the position of the corresponding second frame subject pixel. When a corresponding pixel is found, the position of the subject pixel is moved using −MV5, which is obtained by inverting the direction of the motion vector (in this example, INTER, MV5) of the macroblock of the third frame including the pixel, such that the moved pixel position is aligned with a position within the third frame P-VOP. In this example, the third frame is the base frame, and therefore the pixel position of the reference frame can be tracked to the base frame. Hence, by accumulating the initial value 0, −MV3, and −MV5, which are used during the tracking, the image displacement amount from the subject pixel of the reference frame to the pixel of the base frame corresponding to the subject pixel can be determined.

Figure 14A:
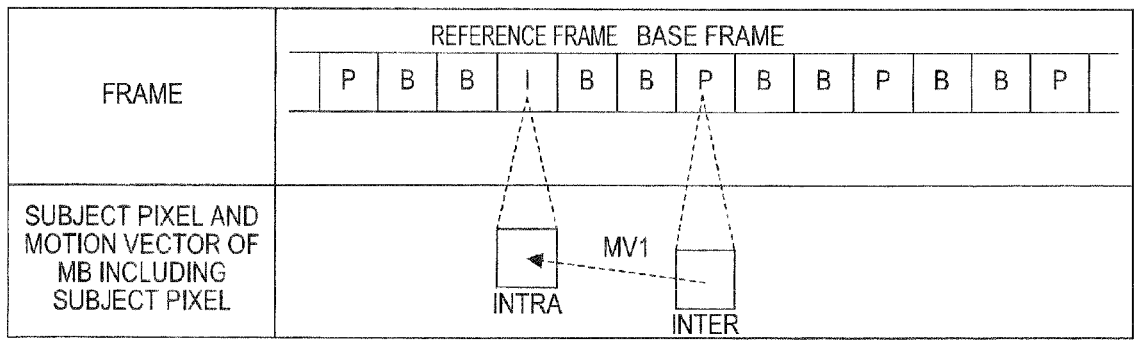
FIGS. 14A-14C are views showing a method of searching for a pixel and a motion vector corresponding to a subject pixel in the example of FIG. 13.
Figure 14B:
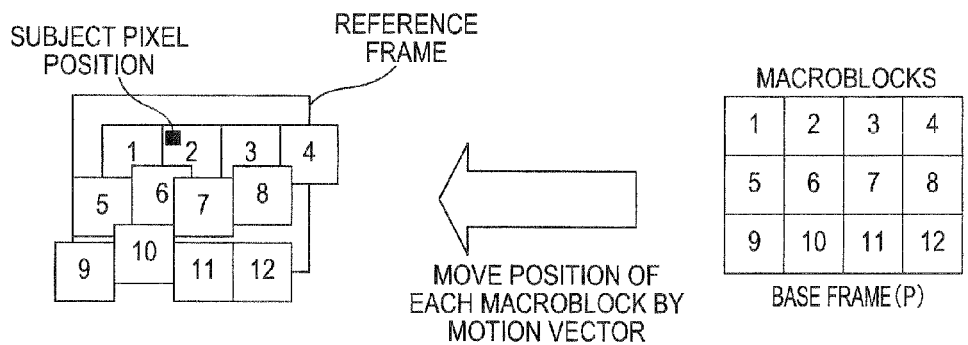
Figure 14C:
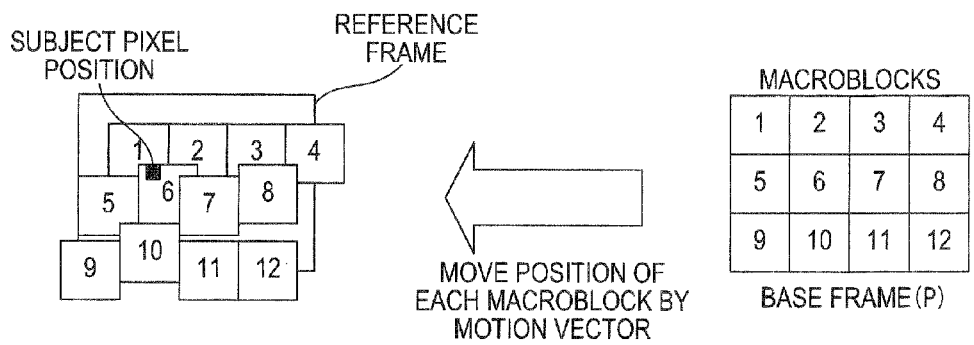

FIGS. 14A-14C are views showing a method of searching for a pixel and a motion vector corresponding to the subject pixel in the example of FIG. 13. FIGS. 14A-14C show a method of searching for a pixel corresponding to a subject pixel of the first frame from all pixels of the second frame P-VOP, which has a motion vector oriented toward the first frame, and a method of searching for a pixel corresponding to a subject pixel of the second frame from all pixels of the third frame P-VOP, in the example of FIG. 13. In the example shown in FIG. 14A, the pixel of a base frame (P-VOP) located seventh from the left to which a subject pixel of a reference frame (I-VOP) located fourth from the left corresponds and the motion vector (MV1 in FIG. 14) of the macroblock including the pixel are searched for.

As shown in FIG. 14B, first, the positions of all macroblocks (all pixels) of the base frame (P) are moved using the motion vectors of the respective macroblocks (all pixels). The result of this movement is shown on the left of FIG. 14B. In an image region resulting from this position movement, the position of the subject pixel of the reference frame is marked, and the pixel located in this position after moving the base frame is the pixel corresponding to the subject pixel. In the example shown in FIG. 14B, a pixel in a macroblock 2 is the pixel corresponding to the subject pixel, and therefore the corresponding pixel in the original macroblock 2 and the motion vector of the macroblock 2 are selected. Thus, the pixel corresponding to the subject pixel can be found.

FIG. 14C shows a case in which a plurality of pixels exist in the marked position of the subject pixel following movement of the base frame. In this case, any of the plurality of pixels may be selected. In the example shown in FIG. 14C, the marked position of the subject pixel corresponds to pixels in macroblocks 1 and 6, and since the macroblock 1 is closer to the center, the corresponding pixel in the macroblock 1 may be selected. Alternatively, when processing is performed in a raster scan sequence for convenience such that a flag is overwritten, the macroblock 6, which comes later in the sequence, may be selected.

Figure 15:
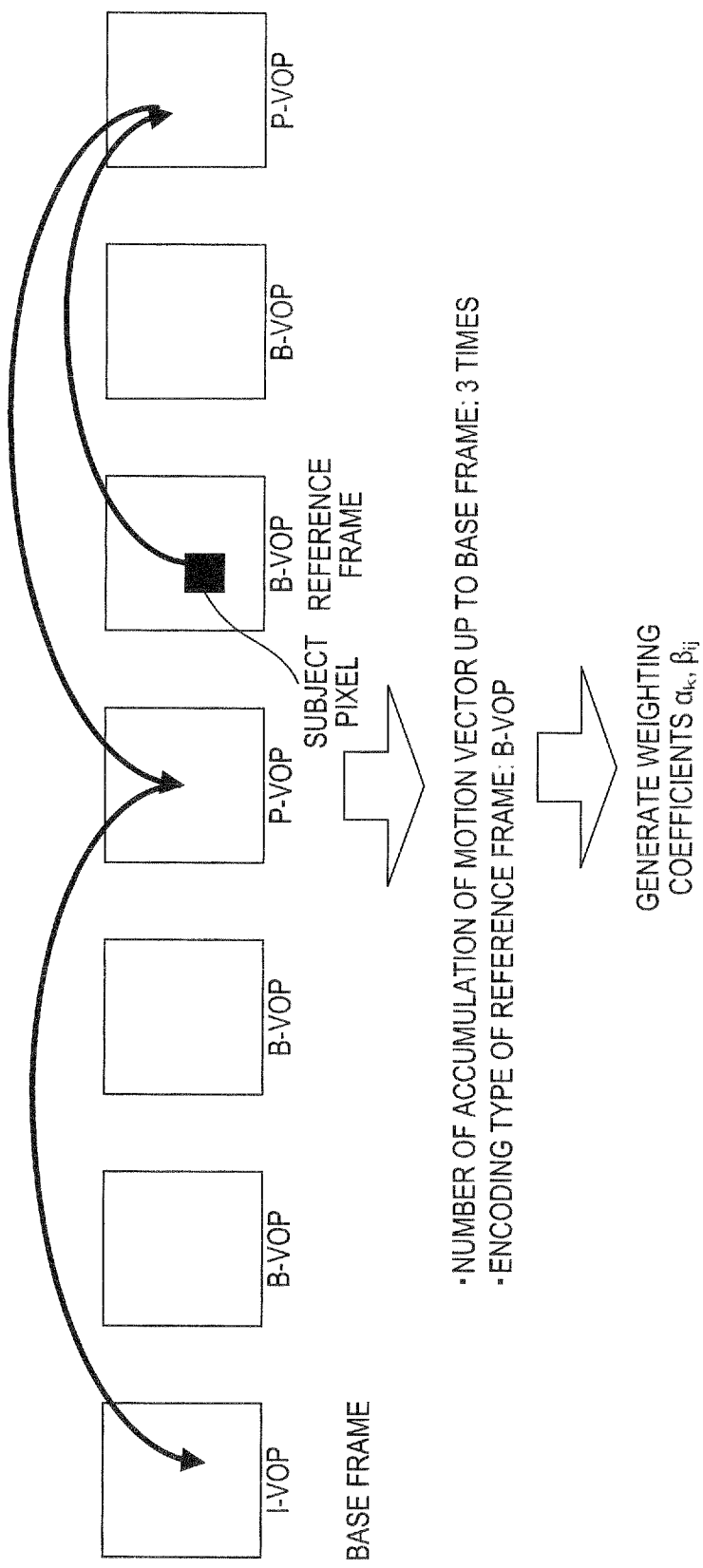
FIG. 15 is a view illustrating the content of weighting coefficient generation processing shown in FIG. 2.

FIG. 15 is a view illustrating the content of the weighting coefficient generation processing (S105) of FIG. 2. In the example shown in FIG. 15, seven frame images exist, a leftmost I-VOP serves as the base frame, a B-VOP located third from the right serves as the reference frame, and a weighting coefficient is generated in relation to a subject pixel in the reference frame located third from the right. In the example shown in FIG. 15, the encoding type of the reference frame including the subject pixel is B-VOP. Further, when the image displacement amount from the subject pixel in the reference frame to the pixel corresponding to the subject pixel in the base frame is calculated using the image displacement amount calculation processing (S104) shown in FIGS. 6 and 7, it is assumed that motion vector accumulation is performed three times.

In this embodiment, a weighting coefficient $\alpha_k$ is generated using the encoding type of the reference frame including the subject pixel. First, a determination is made as to whether or not the encoded moving image data are low compression or high compression data. When the data are low compression data, the weighting coefficient $\alpha_k$ is determined such that a magnitude relationship of "I-VOP>P-VOP≥B-VOP" is established, and when the data are high compression data, the weighting coefficient $\alpha_k$ is determined such that a magnitude relationship of "P-VOP>I-VOP≥B-VOP" or "P-VOP>B-VOP≥I-VOP" is established. The reason for this is that when the encoded moving image data are low compression data, the I-VOP has the highest image quality, but when the data are high compression data, the P-VOP has the highest image quality. Low compression and high compression may be determined such that when a bit rate of the encoded moving image data is larger than a threshold, low compression is determined and when the bit rate is equal to or lower than the threshold, high compression is determined, for example. Alternatively, when a value of a compression ratio (encoding amount of encoded moving image data/encoding amount of moving image data when not compressed) of the encoded moving image data is larger than a threshold, low compression may be determined and when the value is equal to or lower than the threshold, high compression may be determined.

Furthermore, in this embodiment, a weighting coefficient $\beta_{ij}$ is generated using the number of accumulation of the motion vector in the image displacement amount calculation processing (S104). In this case, the weighting coefficient $\beta_{ij}$ is determined to be steadily larger as the number of accumulation of the motion vector in the image displacement amount calculation processing (S104) decreases and steadily smaller as the number of accumulation of the motion vector in the image displacement amount calculation processing (S104) increases.

The weighting coefficient $\alpha_k$ is determined according to the encoding type of the reference frame and is therefore determined for each reference frame, while the weighting coefficient $\beta_{ij}$ is determined according to the subject pixel of the reference frame and is therefore determined for each pixel of the reference frame. The weighting coefficient $\alpha_k$ and the weighting coefficient $\beta_{ij}$ generated in the weighting coefficient generation processing (S105) are used in the resolution improvement processing (S107) to be described below.

Figure 16:
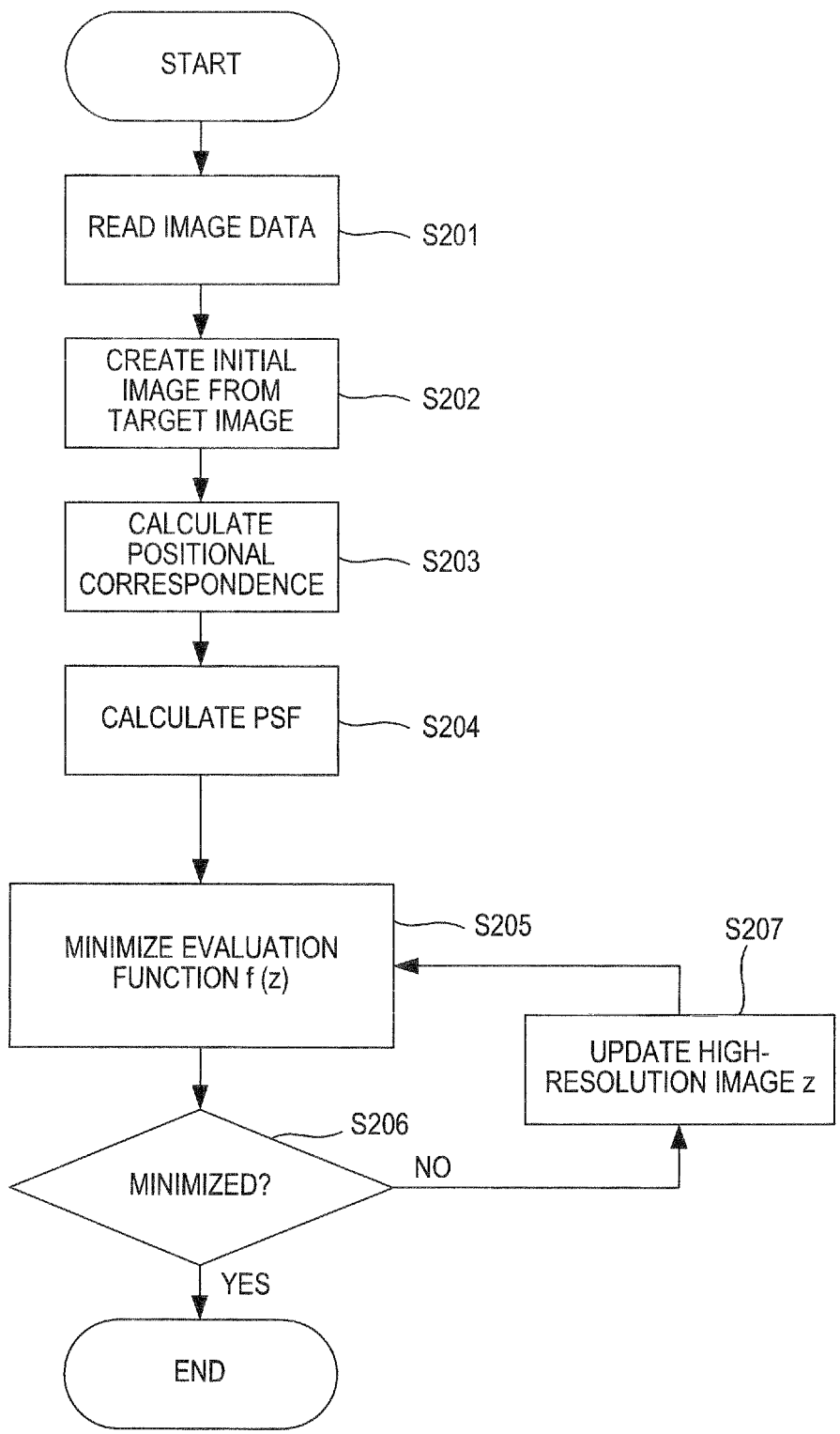
FIG. 16 is a flowchart showing an algorithm of position alignment processing performed by a position alignment processing unit and resolution improvement processing performed by an image resolution improvement processing unit.

FIG. 16 is a flowchart showing an algorithm of the position alignment processing (S106) performed by the position alignment processing unit 16 and the resolution improvement processing (S107) performed by the resolution improvement processing unit 18. The position alignment processing (S106) and the resolution improvement processing (S107), which employs super-resolution processing, will now be described following the flow of the algorithm shown in FIG. 16.

First, image data of the base frame and image data of the reference frame are read (S201). A plurality of reference frames are preferably selected in the frame specification and frame selection processing (S103), and therefore the image data of the plurality of reference images are read in S201. Next, using the base frame as a resolution improvement processing target image, interpolation processing such as bilinear interpolation or bicubic interpolation is performed on the target image to create an initial image $z_0$ (S202). The interpolation processing may be omitted in certain cases. Next, positional correspondence between the target image and the respective reference frames is calculated for each pixel using the image displacement amount calculated in the image displacement amount calculation processing (S104) (S203).

Next, a PSF (Point Spread Function) taking into consideration image pickup characteristics such as an OTF (Optical Transfer Function) and a CCD aperture is determined (S204). The PSF is reflected in a matrix $A_k$ (i, j) shown below in Equation (1), and for ease, a Gauss function, for example, may be used. An evaluation function f (z) shown below in Equation (1) is then minimized using the positional correspondence between the target image and the respective reference frames calculated in S203 and the PSF determined in S204 (S205), whereupon a determination is made as to whether or not f (z) is minimized (S206).

$$f(z) = \sum_k \left\{ \alpha_k \sum_i \sum_j \{ \beta_{ij} \| y_k(i,j) - A_k(i,j)z \|^2 \} \right\} + \lambda g(z) \quad (1)$$

In Equation (1), k is an identification number of the reference frame, i and j are coordinates of the subject pixel in the reference frame, $\alpha_k$ is the weighting coefficient generated using the encoding type of the reference frame, $\beta_{ij}$ is the weighting coefficient generated using the number of accumulation of the motion vector in the image displacement amount calculation processing (S104), $y_k$ (i, j) is a column vector representing image data of the reference frame (a low-resolution image), z is a column vector representing image data of a high-resolution image obtained by improving the resolution of the target image, and $A_k$ (i, j) is an image conversion matrix representing characteristics of the image pickup system such as the positional correspondence between the target image and the respective reference frames, a point image spread function of the optical system, blur caused by a sampling opening, and respective color components generated by a color mosaic filter (CFA). Further, g (z) is a regularization term taking into account image smoothness, a color correlation of the image, and so on, while $\lambda$ is a weighting coefficient. A method of steepest descent, for example, may be used to minimize the evaluation function f (z) expressed by Equation (1). When a method of steepest descent is used, values obtained by partially differentiating f (z) by each element of z are calculated, and a vector having these values as elements is generated. As shown below in Equation (2), the vector having the partially differentiated values as elements is then added to z, whereby a high-resolution image z is updated (S207) and z at which f (z) is minimized is determined.

$$z_{n+1} = z_n + \alpha \frac{\partial f(z)}{\partial z} \quad (2)$$

In Equation (2), $z_n$, is a column vector representing the image data of a high-resolution image updated n times, and $\alpha$ is a stride of an update amount. The first time the processing of S205 is performed, the initial image $z_0$ determined in S202 may be used as the high-resolution image z. When it is determined in S206 that f (z) has been minimized, the processing is terminated and $z_n$ at that time is recorded in the memory 19 or the like as a final high-resolution image. Thus, a high-resolution image having a higher resolution than frame images such as the base frame and the reference frame can be obtained.

In this embodiment, the high-resolution image is generated in the resolution improvement processing unit 18 of the image quality improvement processing unit 22, but instead of the resolution improvement processing (S107), smoothing processing, for example, may be performed in accordance with a weighted average using the weighting coefficients described above such that the image quality of the base frame is improved by reducing random noise.

In this embodiment, the weighting coefficients $\alpha_k$, $\beta_{ij}$ are generated in accordance with the encoding type of the reference frame and the number of accumulation of the motion vector in the image displacement amount calculation processing (S104), and the image quality of the base frame is improved (the resolution is increased) using the weighting coefficients $\alpha_k$, $\beta_{ij}$ and the image displacement amount between the reference frame and base frame. Therefore, weighting can be performed appropriately on each pixel of the reference frame, and as a result, highly precise image quality improvement processing can be performed on the base frame.

Second Embodiment

Figure 17:
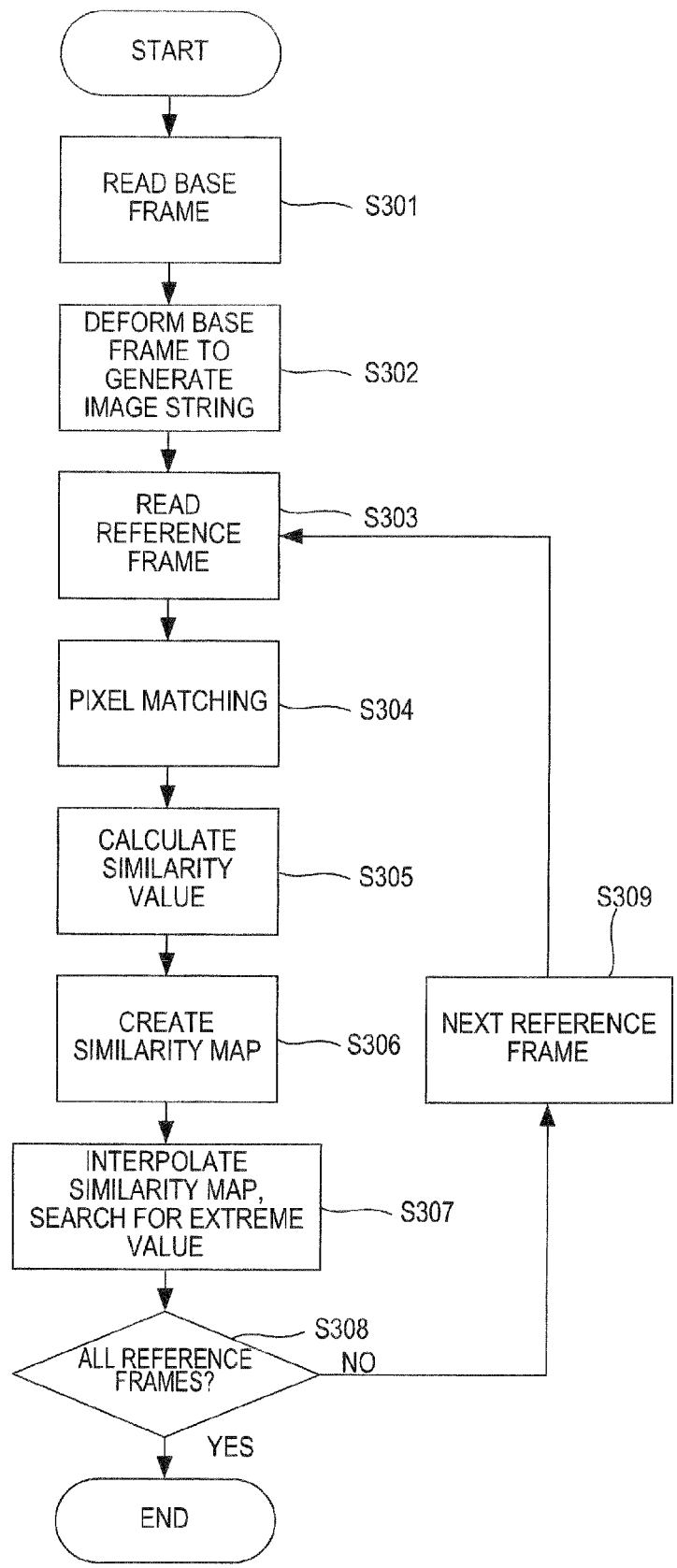
FIG. 17 is a flowchart showing a method of calculating an image displacement amount employed during image displacement amount calculation processing according to a second embodiment of this invention.

FIG. 17 is a flowchart showing an image displacement amount calculation method employed in the image displacement amount calculation processing (S104) according to a second embodiment of this invention. Apart from the points to be described below, the constitution of the image processing apparatus and the content of the image processing method according to this embodiment are identical to those of the image processing apparatus and image processing method according to the first embodiment, and therefore only the differences will be described.

In this embodiment, the image displacement amount between the reference frame and the base frame is calculated by subjecting the base frame and reference frame to pixel matching rather than by accumulating the motion vector.

First, the base frame is read (S301), whereupon the base frame is deformed by a plurality of image displacement parameters to generate an image string (S302). The reference frame selected in the frame selection processing (S103) is then read (S303). Rough pixel position associations between the base frame and the reference frame are then made using a pixel matching method such as an area base matching method (S304).

Next, a similarity value between the image string generated by deforming the base frame in S302 and the reference frame is calculated (S305). This similarity value can be determined as a difference between the image string and the reference frame such as a SSD (Sum of Squared Difference) or a SAD (Sum of Absolute Difference), for example. A discrete similarity map is then created using a relationship between the image displacement parameters used to generate the image string in S302 and the similarity value calculated in S305 (S306). A continuous similarity curve is then determined by interpolating the discrete similarity map created in S306, whereupon an extreme similarity value is searched for on the continuous similarity curve (S307). Methods of determining a continuous similarity curve by interpolating a discrete similarity map include parabola fitting and spline interpolation, for example. The image displacement parameter at the point where the similarity value reaches the extreme value on the continuous similarity curve is calculated as the image displacement amount between the base frame and the reference frame.

A determination is then made as to whether or not image displacement amount calculation has been performed in relation to all of the reference frames used in the resolution improvement processing (S107) (S308), and when image displacement amount calculation has not been performed in relation to all of the reference frames, the processing of S303 to S308 is repeated using another reference frame as the next reference frame (S309). When it is determined in S308 that image displacement amount calculation has been performed in relation to all of the reference frames used in the resolution improvement processing (S107), the processing is terminated.

Figure 18:
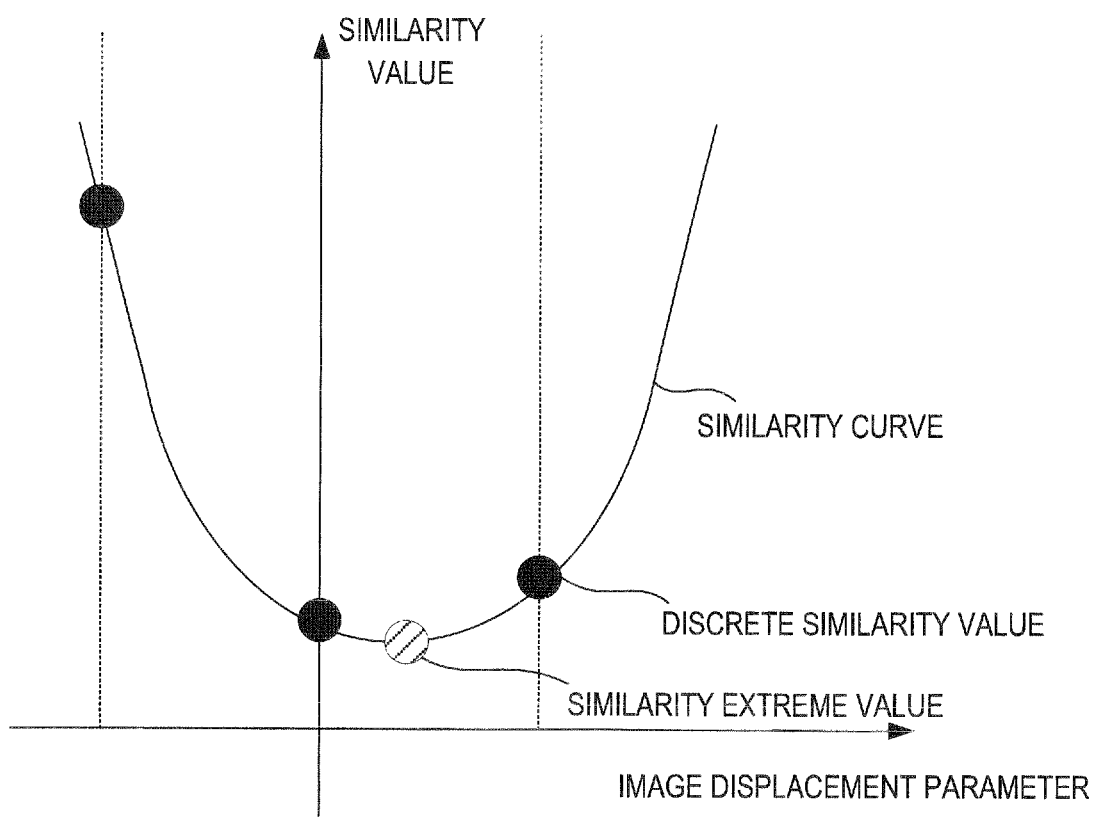
FIG. 18 is a view showing an example of a similarity curve determined in S307 of the image displacement amount calculation processing.

FIG. 18 is a view showing an example of the similarity curve determined in S307 of the image displacement amount calculation processing (S104). In FIG. 18, the ordinate shows the similarity value and the abscissa shows the image displacement parameters used to generate the image string in S302 of FIG. 17. In the example shown in FIG. 18, the similarity between the image string and the reference image is calculated as a SSD and the similarity curve is determined by interpolating a discrete similarity map through parabola fitting, and therefore the similarity increases as the similarity value decreases. By interpolating a discrete similarity map to determine a continuous similarity curve and finding an extreme value (a minimum value in the example of FIG. 18) thereof, the image displacement amount between the base frame and the reference frame can be determined on a sub-pixel level.

Next, similarly to the first embodiment, the weighting coefficient generation processing (S105), position alignment processing (S106), and resolution improvement processing (S107) are performed. However, in the image displacement amount calculation processing (S104), motion vector accumulation is not performed, and therefore the weighting coefficient $\beta_{ij}$ generated using the number of accumulation of the motion vector is not determined. Hence, in this embodiment, the resolution of the base frame is improved by minimizing the evaluation function f (z) shown in a following Equation (3) during S205 of the resolution improvement processing shown in FIG. 16. In Equation (3), weighting is performed using only the weighting coefficient $\alpha_k$ generated in accordance with the encoding type of the reference frame.

$$f(z) = \sum_k \{\alpha_k \|y_k A_k z\|^2\} + \lambda g(z) \qquad (3)$$

In Equation (3), k is an identification number of the reference frame, $\alpha_k$ is the weighting coefficient generated in accordance with the encoding type of the reference frame, $y_k$ is a column vector representing the image data of the reference frame (a low-resolution image), z is a column vector representing the image data of a high-resolution image obtained by improving the resolution of the target image, and $A_k$ is an image conversion matrix representing characteristics of the image pickup system such as the positional correspondence between the target image and the respective reference frames, a point image spread function of the optical system, blur caused by a sampling opening, and respective color components generated by a color mosaic filter (CFA). Further, g (z) is a regularization term taking into account image smoothness, a color correlation of the image, and so on, while λ is a weighting coefficient. The effects of this embodiment are substantially identical to those of the image processing method and image processing apparatus according to the first embodiment.

Third Embodiment

In a third embodiment of this invention, the resolution of the base frame is improved by minimizing the evaluation function f (z) shown in a following Equation (4) during S205 of the resolution improvement processing shown in FIG. 16. In Equation (4), weighting is performed using only the weighting coefficient $\beta_{ij}$ calculated using the number of accumulation of the motion vector of the image displacement amount calculation processing (S104). With regard to all other points, this embodiment is identical to the image processing method and image processing apparatus according to the first embodiment.

$$f(z) = \sum_k \left\{ \sum_i \sum_j \{\beta_{ij} \|y_k(i, j) - A_k(i, j)z\|^2\} \right\} + \lambda g(z) \qquad (4)$$

In Equation (4), k is an identification number of the reference frame, i and j are coordinates of the subject pixel in the reference frame, $\beta_{ij}$ is the weighting coefficient calculated using the number of accumulation of the motion vector of the image displacement amount calculation processing (S104), $y_k(i, j)$ is a column vector representing the image data of the reference frame (a low-resolution image), z is a column vector representing the image data of a high-resolution image obtained by improving the resolution of the target image, and $A_k(i, j)$ is an image conversion matrix representing characteristics of the image pickup system such as the positional correspondence between the target image and the respective reference frames, a point image spread function of the optical system, blur caused by a sampling opening, and respective color components generated by a color mosaic filter (CFA).

Further, g (z) is a regularization term taking into account image smoothness, a color correlation of the image, and so on, while λ is a weighting coefficient. The effects of this embodiment are substantially identical to those of the image processing method and image processing apparatus according to the first embodiment.

This invention is not limited to the embodiments described above, and includes various modifications and improvements within the scope of the technical spirit thereof. For example, in the above embodiments, the position alignment processing unit 16 and the resolution improvement processing unit 18 of the image quality improvement unit 22 are provided separately but may be provided integrally. Furthermore, the constitution of the image processing apparatus 1 is not limited to that shown in FIG. 1. Moreover, after determining the image displacement amount by accumulating the motion vector in the image displacement amount calculation processing (S104), as in the first embodiment, the resolution of the base frame may be improved using the evaluation function f (z) shown in Equation (3) of the second embodiment, for example.

Further, in the embodiments described above, it is assumed that the processing performed by the image processing apparatus is hardware processing, but this invention is not limited to the constitution, and the processing may be performed using separate software, for example.

In this case, the image processing apparatus includes a CPU, a main storage device such as a RAM, and a computer readable storage medium storing a program for realizing all or a part of the processing described above. Here, the program will be referred to as an image processing program. The CPU realizes similar processing to that of the image processing apparatus described above by reading the image processing program recorded on the storage medium and executing information processing and calculation processing.

Here, the computer readable storage medium is a magnetic disk, a magneto-optical disk, a CD-ROM, a DVD-ROM, a semiconductor memory, or similar. Further, the image processing program may be distributed to a computer over a communication line such that the computer, having received the distributed program, executes the image processing program.

What is claimed is:

1. An image processing method that uses encoded moving image data including motion information, the method comprising:
    selecting a base frame and a plurality of reference frames from temporally continuous frame images obtained by decoding the encoded moving image data;
    calculating an image displacement amount between the plurality of reference frames and the base frame;
    generating a weighting coefficient using the motion information of the encoded moving image data; and
    improving an image quality of the base frame using the calculated image displacement amount and the generated weighting coefficient;
    wherein the image displacement amount between the plurality of reference frames and the base frame is calculated by calculating a vector summation by adding up a plurality of motion vectors while taking direction into account;
    wherein the plurality of motion vectors are obtained from temporally different pairs of frame images selected from among the temporally continuous frame images; and
    wherein the weighting coefficient is generated using a number of times that the plurality of motion vectors are added up in the calculation of the vector summation in calculating the image displacement amount.

2. The image processing method as defined in claim 1, wherein, in generating the weighting coefficient, the weighting coefficient is generated using both the encoding type of the plurality of reference frames and the number of accumulation of the plurality of motion vectors accumulated in calculating the image displacement amount.

3. The image processing method as defined in claim 1, wherein, in generating the weighting coefficient, different weighting coefficients are generated in accordance with a bit rate or a compression ratio of the encoded moving image data and the encoding type of the plurality of reference frames.

4. The image processing method as defined in claim 1, wherein improving the image quality comprises performing resolution improvement processing on the base frame.

5. An image processing apparatus that uses encoded moving image data including motion information, the apparatus comprising:
    a frame selection unit which selects a base frame and a plurality of reference frames from temporally continuous frame images obtained by decoding the encoded moving image data;
    an image displacement amount calculation unit which calculates an image displacement amount between the plurality of reference frames and the base frame;
    a weighting coefficient generation unit which generates a weighting coefficient in relation to each pixel of the plurality of reference frames using at least one of an encoding type of the plurality of reference frames and the motion information of the encoded moving image data; and
    an image quality improvement processing unit which improves an image quality of the base frame using the image displacement amount calculated by the image displacement amount calculation unit and the weighting coefficient generated by the weighting coefficient generation unit;
    wherein the image displacement amount calculation unit calculates the image displacement amount between the plurality of reference frames and the base frame by calculating a vector summation by adding up a plurality of motion vectors while taking direction into account;
    wherein the plurality of motion vectors are obtained from temporally different pairs of frame images selected from among the temporally continuous frame images; and
    wherein the weighting coefficient generation unit generates the weighting coefficient using a number of times that the plurality of motion vectors are added up in the calculation of the vector summation by the image displacement amount calculating unit.

6. A non-transitory computer readable storage medium having a program stored thereon that controls a computer to execute image processing using encoded moving image data including motion information, the program controlling the execution of functions comprising:
    selecting a base frame and a plurality of reference frames from temporally continuous frame images obtained by decoding the encoded moving image data;
    calculating an image displacement amount between the plurality of reference frames and the base frame;
    generating a weighting coefficient using the motion information of the encoded moving image data; and
    improving an image quality of the base frame using the calculated image displacement amount and the generated weighting coefficient;

wherein the image displacement amount between the plurality of reference frames and the base frame is calculated by calculating a vector summation by adding up a plurality of motion vectors while taking direction into account;
wherein the plurality of motion vectors are obtained from temporally different pairs of frame images selected from among the temporally continuous frame images; and
wherein the weighting coefficient is generated using a number of times that the plurality of motion vectors are added UP in the calculation of the vector summation in calculating the image displacement amount.

* * * * *